July 12, 1966
C. W. VOGT
3,260,285
APPARATUS AND METHOD FOR FILLING CONTAINERS
FOR PULVERULENT MATERIAL
Filed Aug. 5, 1963
2 Sheets-Sheet 1
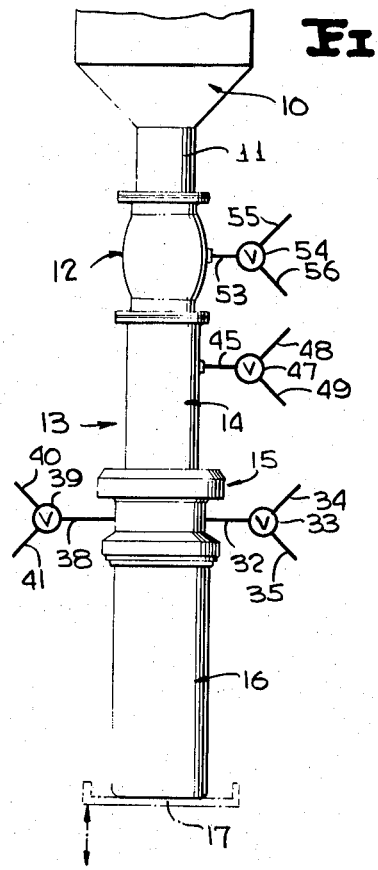
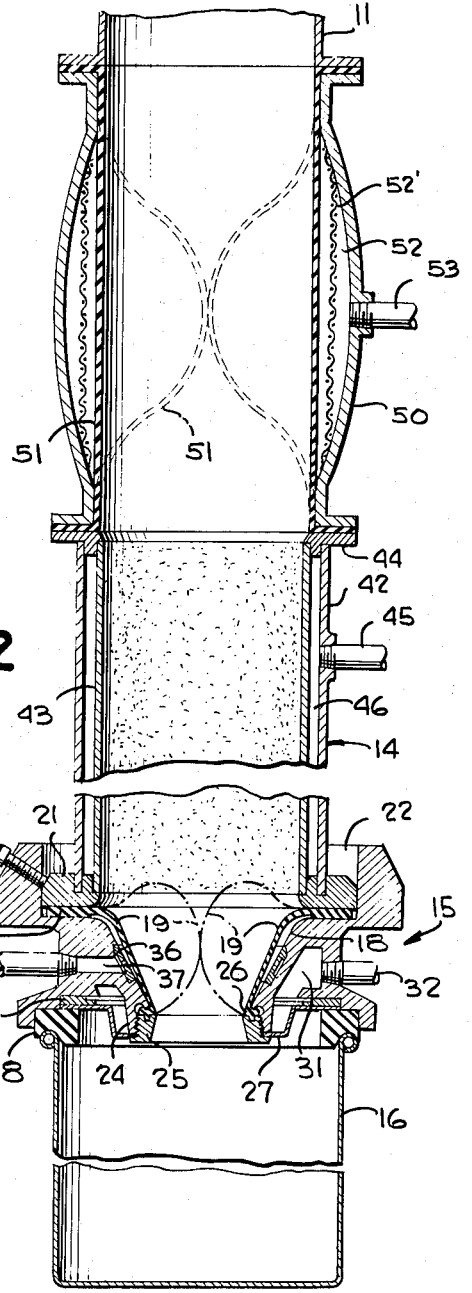
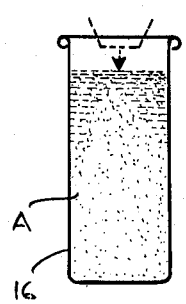
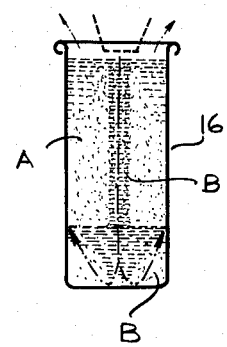
INVENTOR
CLARENCE W. VOGT
BY
ATTORNEYS July 12, 1966 C. W. VOGT 3,260,285
APPARATUS AND METHOD FOR FILLING CONTAINERS
FOR PULVERULENT MATERIAL
Filed Aug. 5, 1963 2 Sheets-Sheet 2
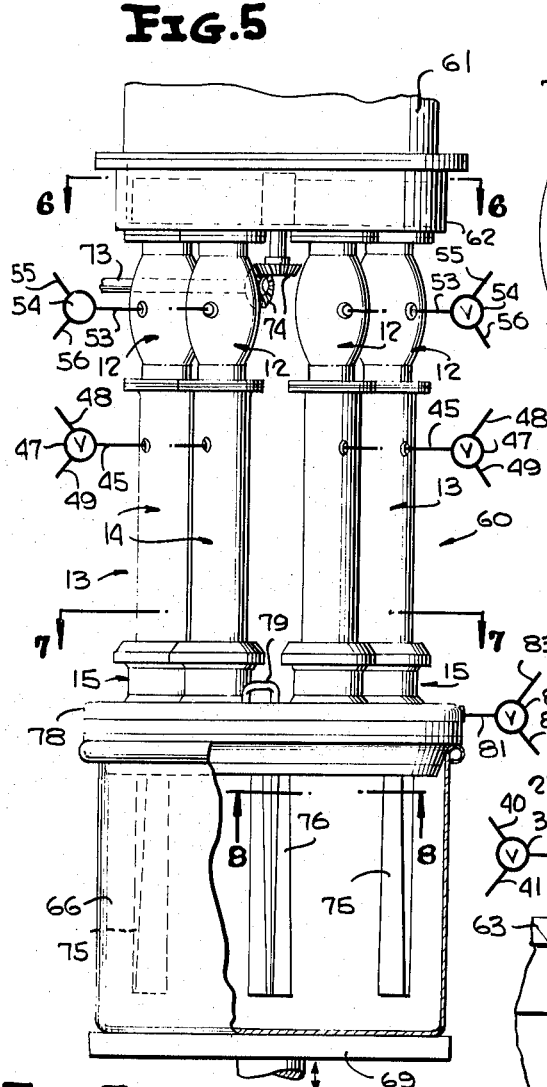
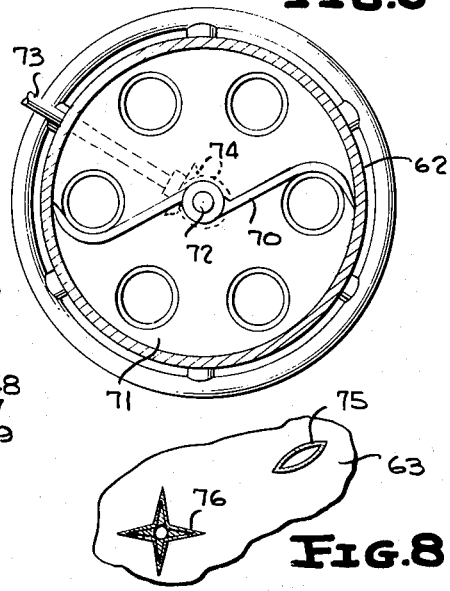
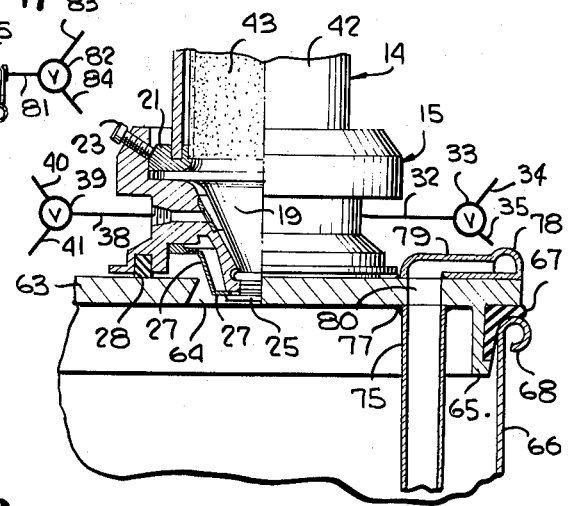
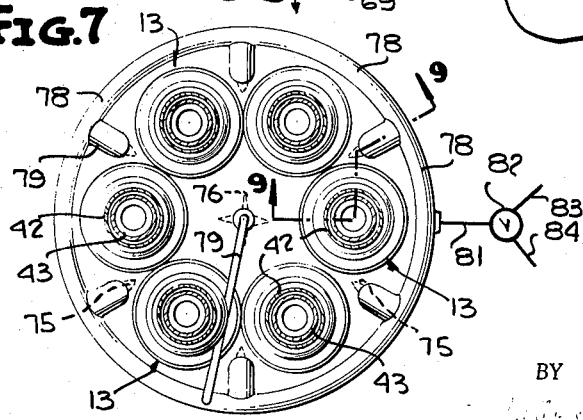
INVENTOR
CLARENCE W. VOGT
BY
ATTORNEYS

United States Patent Office 3,260,285
Patented July 12, 1966

3,260,285
APPARATUS AND METHOD FOR FILLING CONTAINERS FOR PULVERULENT MATERIAL
Clarence W. Vogt, Box 232, Westport, Conn.
Filed Aug. 5, 1963, Ser. No. 299,696
13 Claims. (Cl. 141—8)

In the past I have found that pulverulent materials may be readily dispensed into containers under the influence of a differential gas pressure in an economically feasible manner wherein a major portion of the normally entrapped air is removed from the container. Such a filling method has been found not only to permit an increase in the weight of a given product that may be packaged within a given volume container, but also since the unit weight of pulverulent material per given volume primarily depends upon the amount of entrapped air and since to a large degree the entrapped air is removed, I have been able to obtain very accurate weights.

The controlled filling of packages utilizing a differential gaseous pressure has been restricted to the complete filling of a container. As a result, the size of container which may be filled utilizing differential gaseous pressure has been restricted by the size of the apparatus or the need for a large number of filling operations. Thus, while the filling of containers utilizing differential gaseous pressure has proven advantageous in many instances, it has had limitations as to capacity in the past. It is readily apparent that a manufacturer of fillers utilizing any process cannot financially afford to build a very large number of different size fillers and, therefore, it is expedient from an economical standpoint that only several different sizes of fillers be sufficient for the purpose of filling a full range of sizes of containers.

In view of the foregoing, it is the primary object of this invention to provide a novel filler for filling containers with pulverulent material utilizing a differential gaseous pressure and wherein the filler is not restricted as to capacity by the size of a chamber which is utilized during the full effect of differential gaseous pressure flow.

Another object of this invention is to provide a novel filler which is of a size heretofore utilized in a gaseous pressure differential filling operation for filling a relatively small container, which filler has been modified so that the capacity thereof is increased many fold without a loss of effectiveness in the final filling operation.

A further object of this invention is to provide a novel filler for filling containers of various sizes with pulverulent material, the filler being attached to a hopper for receiving either a continuous or intermittent supply of pulverulent material and the filler being provided with a valve structure of the type wherein the pulverulent material many initially flow through the filler under the sole influence of gravity, after which a container which has been substantially filled to the top by gravity flow may be further filled by the introduction of additional pulverulent material thereinto under the influence of gaseous pressure with the final filling operation effecting the removal of entrapped air or gas from within the container and thus providing space for additional material within the container.

A still further object of this invention is to provide a novel filler for filling containers with pulverulent material wherein the filler is of a conventional type utilized for differential gaseous pressure filling and wherein an additional valve has been added upstream of the usual magazine of the filler whereby a container may be initially filled by either gravity flow or vacuum influence flow of the material through the filler, after which the upstream valve may be closed and a topping off filling operation may take place utilizing differential gaseous pressure in the manner for which the filler was originally designed with the topping off operation resulting in the removal of a large quantity of entrapped air from within the container and the addition of material to that within the container wherein not only is the container filled with more material than possible under gravity flow, but also the weight per unit volume of the container may be accurately maintained.

Still another object of this invention is to provide a multiple head filler for filling large containers, such as drums and the like, the filler having incorporated therein probes which are positioned within a container during a filling operation of the purpose of withdrawing from the container air and other gases which may be entrapped within pulverulent material during the filling of a container therewith whereby a larger quantity of pulverulent material may be placed within a given size large container and with the weight of the fill within the container being extremely accurate due solely to the filling operation, the filling head being of a construction wherein the use of scales to control the amount of fill is not required.

In the past it had been thought that maximum filling efficiency could be obtained only by utilizing a complete gaseous pressure differential filling operation. However, I have found that there is an unexpected flow phenomena when a container is loosely filled with pulverulent material and an attempt is made to add additional pulverulent material to the container by a gaseous pressure differential filling operation. With my filler construction, there is an impact of the pulverulent material against the pulverulent material loosely placed within the container with the result that added pulverulent material bores down through the pulverulent material initially loosely placed within the container and goes to the bottom of the container, after which it reverses its path. Such a flow action results in the upward flow of entrapped air and gases within all of the pulverulent material in the container so that there is a simultaneous addition of pulverulent material to the container and a driving off of the entrapped gases within the loosely filled pulverulent material whereby a filling operation having a capacity and weight accuracy substantially equal to a complete gaseous pressure differential filling operation is possible.

Accordingly, another object of my invention is to provide a novel method of filling large containers with pulverulent material, the method including the steps of loosely filling a container to substantially the top thereof by gravity flow of the pulverulent material from an elevated source, sealing off a charge of the pulverulent material within a filler, and then directing the charge of pulverulent material from within the filler into the gravity filled container by means of differential gaseous pressure to effect a removal of a large quantity of entrapped air and gases from within the gravity filled pulverulent material and replacing the air and gases with additional pulverulent material from the charge within the filler.

Still another object of this invention is to provide a novel method of filling large containers with a relatively small capacity filler, the method including the steps of drawing a vacuum within a container being filled to effect a partial vacuum, partially gravity flow of pulverulent material into the container with a large amount of the normally entrapped air and gases being removed from the pulverulent material as it enters into the container, sealing off a charge of pulverulent material within the filler, then utilizing gaseous pressure differential to effect the further flow of material into the container while removing other of the entrapped air and gases to effect a greater compaction of the material within the container and an accurate weight per unit volume fill.

In accordance with my invention, my final filling operations under the influence of differential gaseous pressure may be one of vacuum alone wherein atmospheric pressure as opposed to the vacuum provides the differential pressure, the pressure may be super-atmospheric pressure alone, or the pressure may be a combination of super-atmospheric pressure and vacuum.

With the above and other objects in view that will hereinafter appear, the nature of the invention will be more clearly understood by reference to the following detailed description, the appended claims and the several views illustrated in the accompanying drawings.

In the drawings:

FIGURE 1 is a schematic elevational view showing the manner in which a container having a capacity greater than the magazine capacity of a filler may be filled with pulverulent material utilizing a gaseous pressure differential filling in accordance with my invention to accomplish the additional fill.

FIGURE 2 is an enlarged fragmentary vertical sectional view taken through the filler and container of FIGURE 1 and shows more specifically the details of the filler.

FIGURE 3 is a schematic view showing the manner in which a container may be initially filled either by gravity or under the influence of vacuum and gravity with the pulverulent material within the container having trapped therein an undesirable quantity of air and other gases.

FIGURE 4 is a schematic view similar to FIGURE 3 and shows that during a topping off or final filling operation utilizing the influence of differential gaseous pressure the pulverulent material added to the container passes downwardly through the pulverulent material loosely placed within the container and reverses its direction of flow upon striking the bottom of the container to flow upwardly to fill the bottom of the container, the material driving off the trapped air and other gases within the pulverulent material initially present within the container.

FIGURE 5 is a fragmentary elevational view of a multiple head filler for filling large drums and other large containers in accordance with this invention, a portion of the container being broken away and shown in section to illustrate the existence of air and other gas removing probes within the container during the filling operation.

FIGURE 6 is a fragmentary horizontal sectional view taken generally along the line 6—6 of FIGURE 5 and shows the general manner in which pulverulent material from within a gravity supply hopper is distributed to the individual fillers of the filler unit.

FIGURE 7 is a fragmentary horizontal sectional view taken along the line 7—7 of FIGURE 5 and shows generally the arrangement of the fillers and the details of a manifold connecting together the probes.

FIGURE 8 is a fragmentary horizontal sectional view taken generally along the line 8—8 of FIGURE 5 and shows the specific sections of the several probes.

FIGURE 9 is a fragmentary enlarged vertical sectional view taken along the line 9—9 of FIGURE 7 and shows more specifically the details of one filler and one probe.

Referring now to the drawings in detail, reference is first made to the filler construction shown in FIGURES 1 and 2. In accordance with the invention, a pulverulent material supply hopper 10 is provided for delivering pulverulent material by gravity. The hopper 10 has a lower pipe or chute section 11 to which there is connected a flow control valve, generally referred to by the numeral 12. Details of the flow control valve 12 will be set forth hereinafter.

There is connected to the flow control valve 12 a differential gaseous pressure type filler generally referred to by the numeral 13. The filler 13 includes an upper magazine generally referred to by the numeral 14, and a lower flow control head, generally referred to by the numeral 15.

A large capactiy container 16 is illustrated in sealed engagement with the lower discharge end of the filler 13, the container 16 being illustrated schematically as being supported by a vertically movable support 17 which may be actuated in any conventional manner. It is to be noted that in accordance with this invention the container 16 is larger than the magazine 14. However, the use of the filler 13 is not restricted to large size containers, such as the container 16. This will be clarified hereinafter.

As is best shown in FIGURE 2, the flow control head 15 is constructed to have a downwardly tapering conical passage 18 therethrough. The conical passage 18 has seated therein a conical valve member 19 which is provided at its upper end with an integral enlarged retaining ring 20 that is clamped in place by means of a collar or ring 21. The collar or ring 21 is seated in an upper socket 22 formed in the upper end of the flow control head 15 and is releaseably clamped in place by a plurality of set screws 23 of which only one is illustrated.

The flow control head 15, in the illustrated form of the invention, is provided with a lower internally threaded extension 24 into which there is threaded a retaining nut 25. The retaining nut 25 serves the dual purpose of clamping in place an enlarged lower bead 26 of the valve member 19 and clamping an inner edge of a saucer shaped filter screen 27 to the extension 24. The lower part of the flow control head 15 is provided with an annular gasket 28 which is contoured for engagement with an upper end of the container 16 to effect a seal therewith. The outer peripheral portion of the filter screen 27 overlies the gasket 28 and is clamped between the gasket 28 and an upper gasket member 30 is sealed engagement.

The flow control head 15 is provided with an annular passage 31 which is in communication with the filter screen 27. Air is exhausted from and admitted to the annular passage 31 by means of a pipe 32 which, as is shown in FIGURE 1, is connected to a valve 33. The valve 33 has two pipes 34 and 35 connected thereto. Depending upon the type of operation, the connections of the pipes 34 and 35 will vary. However, the pipe 34 will normally be connected to a pressurized source whereby air may be blown back through the filter screen for the purpose of cleaning the same. In most instances the pipe 35 will be connected to a vacuum source although it is feasible that it could be open to the atmosphere. The flow control head 15 is provided with a distributing ring 36 which is seated in the wall of the flow control head 15 defining the passage 18. A passage 37 extends outwardly from the distributing ring 36 and has connected thereto a pipe 38. As is best shown in FIGURE 1, the pipe 38 is connected to a valve 39 to which there is connected an air pressure pipe 40 and a vacuum pipe 41.

The magazine 14 is formed of an outer shell 42 and an inner liner 43 which is preferably formed of filter screen material. The collar or ring 21 connects together the lower ends of the shell 42 and the liner 43, and an upper mounting collar or flanged member 44 connects together the upper ends of the shell 42 and the liner 43. A pipe 45 is connected to the shell 42 and opens into a space 46 between the shell 42 and the liner 43. The pipe 45, as is best shown in FIGURE 1, is connected to a valve 47. A pipe 48 extends from the valve 47 and is connected to a gaseous pressure source. A pipe 49 may also extend from the valve 47 and depending upon the filling operations of the filler 13, may be open to the atmosphere or connected to a vacuum source.

The flow control valve 12 includes an outer shell 50 which is suitably secured to the magazine 14 and the hopper 10. Within the shell 50 is a flexible liner 51 which is preferably formed of rubber or rubber substitutes so as to also be resilient. It is to be noted that there is a space 52 between the shell 50 and the liner 51, which liner 51 functions as a valve member. A pipe 53 is connected to the shell 50 and opens into the space 52. A screen 52' is mounted within the space 52 and is secured to the shell 50 for the purpose of preventing the valve member 51 from being drawn outwardly into engagement with the shell 50 and in a position wherein the pipe 53 is blocked. A valve 54 is connected to the pipe 53, as is best shown in FIGURE 1, and a pressure supply pipe 55 and a vacuum pipe 56 are connected to the valve 54 for the purpose of opening and closing the valve member 51.

In accordance with this invention, when it is desired to fill the container 16, the container 16 is brought into sealing engagement with the gasket 28 by the upward pressure exerted on the container 16 through the support 17. At this time the valve member 19 is in a closed position, the valve member 19 having been inwardly contracted to its phantom line position of FIGURE 2 by air pressure acting externally thereon through the pipe 38. Accordingly, there could be no downward flow of pulverulent material through the filler 13. After the container 16 has been securely clamped in place against the gasket 28, the valve 39 is actuated to connect the pipe 38 to a vacuum source with the result that the valve member 19 returns to its solid line position of FIGURE 2 and flow of pulverulent material from the hopper 10 down through the control valve 12 and the filler 13 under the influence of gravity is permitted. The container 16 is filled by gravity until flow of the material has stopped or for a time period within which the necessary flow by gravity would normally take place. A vacuum may then be drawn through the pipe 32 which results in the drawing of a vacuum within the container 16 through the filter screen 27. The drawing of a vacuum at this time will result in the removal of entrapped air and gas from within the gravity filled pulverulent material in the container 16 and the differential gaseous pressure on the column of pulverulent material within the magazine 14 will result in the introduction of additional pulverulent material into the container 16. It has been found that the topping off of the filling operation of the container 16 by the application of vacuum pressure differential filling will result in a marked increase in the weight of the material packaged within the container. Even more beneficial, it will result in a more even distribution of material and removal of entrapped gases so that the fill placed within the containers will be very uniform. After the filling operation has been concluded, the valve 33 is switched to a pressure blowing position and the dust which may be on the filter screen 27 is delivered therefrom into the container 16. This may occur after or simultaneously with the closing of the valve member 19 by the operation of the valve 39 to switch from its vacuum position to its pressurized position. The container 16 may now be removed from the filler 13 without any loss of material from the filler 13.

If the weight of the material within the container 16 is desired to be increased over that obtainable with a vacuum topping off, then the valve 12 may be closed by the introduction of air into the shell 52 through the pipe 53. Then the valve 47 may be turned to its pressure position so that air may be delivered into the magazine 14 under pressure. This application of pressure to the pulverulent material trapped within the magazine 14 will result in an expulsion of the trapped gases within the container 16 and the addition of other pulverulent material to that which was already placed within the container 16 by gravity. At this time it is pointed out that even better compaction and more uniform filling may be obtained if a combination of the application of super-atmospheric gaseous pressure on the pulverulent material within the magazine 14 and the drawing of a vacuum through the flow control head 15 is utilized.

Furthermore, it has been found that best filling results are obtained if there is an initial downward surge of the pulverulent material into the container 16. Therefore, in each topping off operation it may be desirable to externally pressurize the valve member 19 so as to move it to its closed position before the topping off operation is commenced. This results in the lifting up of the pulverulent material within the magazine 14, and when the valve member 19 is quickly opened, accompanied by the influence of a differential gaseous pressure on the pulverulent material within the magazine 14, there will be a sudden downward thrusting of the pulverulent material through the valve member 19 into the pulverulent material previously delivered to the container 16. As is best shown in FIGURES 3 and 4, although a container 16 may be initially loosely filled with pulverulent material, as is best shown in FIGURE 3, much more additional material may be added to the contained 16 by the aforementioned topping off operations. When there is a thrusting of the topping off material against the loosely filled material in the manner described above, the topping off material bores down through the loosely filled material, strikes the bottom of the container 16 and reverses its flow, as is best shown in FIGURE 4. In FIGURES 3 and 4 the initially supplied material is referred to by A and the topping off material is referred to by B. Experiments have been made utilizing different colored materials, such as chocolate and vanilla puddings within a transparent container and it has been found that this phenomenon constantly results during a topping off operation.

At this time it is also pointed out that the filling of the container 16 may be expedited if in lieu of permitting the pulverulent material to flow through the filler 13 by gravity, a vacuum is drawn through the pipe 32 during the entire initial filling operation. When filling is by means of a vacuum, the topping off operation will normally be a combination of pressure plus vacuum. However, it is feasible to initially fill with the aid of a vacuum drawn through the pipe 32 and the final topping off by means of either or both an increase in the vacuum or the closing of the valve member 19 prior to the final topping off or filling.

The valve member 19 illustrated in FIGURE 2 is referred to as a simplex valve in that it operates solely by the inward extension of the valve member 19 to its dotted line position of FIGURE 2 by external pressure thereon. Such a valve is required during a filling operation by gravity alone. However, when the initial filling operation is a combination of gravity and vacuum, a slightly modified form of valve member may be utilized. Such modified form of valve member may be considered a duplex valve and in lieu of having an open lower end as the valve member 19 has, the lower end of the modified valve member will be closed by means of a plurality of cooperating flaps which would normally be pie-slice shaped. The advantage of the duplex valve member over the simplex valve member is that at the termination of a topping off operation the pulverulent material will back up against the flap members of the duplex valve and automatically close the same. Then when the duplex valve member is closed by external air pressure thereon, the pervulent material which is squeezed below the inwardly expanding valve member 19 will be trapped by the flap members and there will be no tendency of the duplex valve member to lose or dribble any of the pulverulent material after the filling operation whereas there is that possibility with respect to the simplex valve member 19 illustrated in FIGURE 2. The saucer-shaped filter 27 is of an adequate depth to accommodate all material that may be entrapped below the simplex valve member 19 at the time of closing thereof so that when the container is removed, any material dropping from beneath the valve member 19 will be received in the recess defined by the filter 27.

It is to be understood that with the arrangement shown in FIGURES 1 and 2, the filler 13 may also be utilized in filling the container 16 in a series of operations wherein the filling takes place after the valve 12 is closed. Also, it is to be understood that the filler 13 may be utilized for filling containers smaller than the container 16 wherein several containers may be filled for each filling of the magazine 14. The supply of pulverulent material within the magazine 14 may be replenished by merely opening the valve 12 and permitting the pulverulent material to flow into the magazine from the hopper 10.

Referring now to FIGURES 5 through 9 in particular, it will be seen that there is illustrated a modified form of filler unit which is generally referred to by the numeral 60 and which is particularly adapted for filling very large containers, such as drums and the like. The filler unit 60 includes a hopper 61 into which pulverulent material may be delivered in any desired manner. The hopper 61 has a lower distributing unit 62 to which a plurality of control valves 12 are connected. To each control valve 12 there is connected a magazine 14 of a filler 13. Each filler 13 also includes flow control heads 15, and the specific construction and function of the fillers 13 having been specifically disclosed hereinabove, no further discussion is needed here.

In lieu of the flow control heads 15 being directly engageable with a container, the filler unit 60 includes a closure member 63 to which the flow control heads 15 are suitably secured in sealed relation. The seal between each flow control head 15 and the closure member 63 may be accomplished by means of the gasket 28 by a slight modification thereof. The closure member 63 is provided with an opening 64 for receiving dispensing portions of each of the flow control heads 15.

It is to be noted that the underside of the closure member 63 is provided with a downwardly projecting annular flange 65 of a size to be received within a container 66 to be filled. The underside of the closure member 63 is provided with an annular gasket 67 which is adapted to be engaged in sealing relation with an upper end portion 68 of the container 66. In FIGURE 5 there is illustrated a suitable support 69 for the container 66, the support 69 being vertically reciprocated to engage and disengage a container 66 with respect to the closure member 63.

The distributing unit 62, as is best shown in FIGURE 6, is provided with a rotary pusher 70 which rotates above a bottom plate 71 of the distributing unit 62 for the purpose of assuring the flow of pulverulent material from the hopper 61 down into the valves 12. The rotary pusher 70 is carried by a shaft 72 which extends through the bottom plate 71 and is driven from a shaft 73 by meshed gears 74, as is best shown in FIGURE 5.

In order to facilitate the removal of air and other entrapped gases from within the container 66 being filled, the closure member 63 carries a plurality of probes 75 and 76. Each probe 75 is illustrated as being of an oval cross section whereas the probe 76 is of a star cross section. Each of the probes 75 and 76 is hollow and is formed of a suitable filter screen material, such as sintered polyethylene screen or sintered stainless steel screen. As is clearly shown in FIGURE 9, a probe is secured to the underside of the closure member 63 by welding 77. The probes 75 and 76 are of tapered configurations so as to facilitate their removal from within the pulverulent material after the container 66 has been filled and have closed lower ends.

The closure member 63 is provided on the upper side thereof with a manifold 78 which has branches 79 leading therefrom and being secured to the upper surface of the closure member 63 in alignment with the probes 75 and 76. The closure member 63 is provided with an opening 80 therethrough for each of the probes 75 and 76.

It will be understood that basically the operation of the filler unit 60 is the same as that of the filler unit illustrated in FIGURES 1 and 2. However, because of the desire to fill a very large container utilizing fillers 13 of the same size for filling a smaller container, such as the container 16, there is a plurality of fillers 13 incorporated in the filler unit 60. The distributing unit 62 of the hopper 61 assures the even delivery of pulverulent material from the hopper 61 to the individual fillers 13. When the valve members 19 and 51 are in their open positions, pulverulent material may freely flow from the hopper 61 through the valves 12 and the fillers 13 into the container 66. If desired, the probes 75 and 76 could be vented to the atmosphere. However, they would have little effect when the container 66 is being filled by gravity alone.

Particular reference is made to FIGURES 5 and 7 wherein it is shown that a pipe 81 leads from the manifold 78 to a valve 82. The valve 82 has connected thereto a vacuum pipe 83 and a compressed air or gas pipe 84.

When the initial filling of the container 66 is accomplished by gravity alone, it is not necessary that the probes 75 and 76 be vacuumized, although a light vacuum will aid in the removal of air and gases from within the container 66 during the gravity filling operation. On the other hand, it has been found to be highly desirable to draw a relatively heavy vacuum through the probes 76 and 76 during a topping off operation of the type previously described with respect to the filler unit shown in FIGURES 1 and 2. The probes 75 and 76 supplement the action of the filler screen 27 to permit a withdrawal of entrapped air and other gases from within the pulverulent material which would not otherwise be accessible to the filter screen 27. Furthermore, when it is desired to fill the container 66 by a combination of gravity and vacuum influences, then air and other gases will be withdrawn from the container 66 through the filter screen 27 and through the probes 75 and 76.

It is to be understood that the preferred operation of the filler unit 60 is with the fillers 13 being utilized simultaneously in the topping off operation. However, while this is the preferred mode of effecting the topping off operation, it is feasible to utilize the fillers 13 in sequence.

It is also to be understood that the probes 75 and 76, like the filter screen 27, will have a slight tendency to become clogged. Accordingly, at the end of each container filling operation before the container is removed out of sealed engagement with the closure member 63, the valve 82 will be actuated to back blow through the probes 75 and 76 and thus clean the same without the loss of the pulverulent material and while maintaining a dust free operation.

Typical examples of tests conducted in accordance with this invention are set forth below. In each instance a detergent was used to fill the same container.

Utilizing 27½ inch vacuum and 15 p.s.i. positive pressure, the following weights were obtained with a single shot:

113.4 grams
113.2 grams
113.1 grams
113.0 grams
113.1 grams

The same container was filled with a single shot utilizing differential pressure due only to a 27½ inch vacuum with the following results:

112.4 grams
112.5 grams
112.5 grams
112.3 grams
112.3 grams

The same container was gravity filled in a series of tests and the average weight of the fill was found to be 93 grams. When the gravity filled container was topped off by a single shot filling of 27½ inch vacuum, the following results were obtained:

112.5 grams
112.5 grams
112.6 grams
112.6 grams
112.6 grams

Gravity filled containers were then topped off with a single short additional fill at 15 p.s.i. positive pressure, no vacuum with the following results:

113.0 grams
112.9 grams
113.2 grams
113.0 grams
112.8 grams

In a further run the same gravity filled container was topped off utilizing 27½ inch vacuum and 15 p.s.i. positive pressure; the following results were obtained with a single shot:

115.0 grams
114.6 grams
115.0 grams
114.6 grams
114.5 grams

From the foregoing, it will be apparent that unexpected results are obtained in that as good or better results are obtained through the initial filling of the container by gravity and then utilizing a topping off fill as compared to the complete filling of the container by differential gas pressure action.

It is to be also noted that similar results have been obtained with other materials, including flour, puddings and gelatin.

It is pointed out that in all of the tests the differential pressure between the interior of the container and the exterior thereof is no greater than 15 p.s.i. While the differential pressure on the walls of the container has been held to a relatively low pressure, the results obtained in accordance with this invention are better than those wherein filling will be accomplished by means of pressure alone even though the pressure is raised to as high as 100 p.s.i. due to the fact that the differential pressure on the walls of the container is held at a relatively low figure during the filling of the container. In accordance with this invention, it will be apparent that the filling processes disclosed herein may be readily utilized with existent types of rigid and flexible containers.

It will be readily apparent that the apparatus and method disclosed herein will be very useful in the filling of containers of relatively large sizes. It will also be apparent that it is feasible in accordance with this invention to first gravity fill containers on an assembly line basis and then provide a topping off fill at a later station.

From the foregoing, it will be seen that novel and advantageous provision has been made for carrying out the desired end. However, attention is again directed to the fact that variations may be made in the example methods and apparatus disclosed herein without departing from the spirit and scope of the invention, as defined in the appended claims.

I claim:

1. A filler unit particularly adapted for high capacity filling of containers with pulverulent material, said filler unit comprising a pulverulent material supply source, a differential gaseous pressure filler, and conduit means between said pulverulent material supply source and said filler and in alignment with said filler, said conduit means including a shut-off valve for sealing said filler above a charge of pulverulent material therein, said filler and said conduit being disposed in generally upright positions with said material supply source being located above said filler for effecting the gravity flow of pulverulent material therethrough, said filler having means for drawing a vacuum in a container being filled to supplement the gravity flow of pulverulent material through said filler.

2. A filler unit particularly adapted for high capacity filling of containers with pulverulent material, said filler unit comprising a pulverulent material supply source, a differential gaseous pressure filler, and conduit means between said pulverulent material supply source and said filler and in alignment with said filler, said conduit means including a shut-off valve for sealing said filler above a charge of pulverulent material therein, said filler including a magazine, and a flow control head at one end of said magazine, means on said flow control head for forming a seal with a container to be filled, a discharge passage through said flow control head terminating in a discharge opening, a filter screen surrounding said discharge opening, a vent passage through said flow control head and in communication with said filter screen to receive gas passing therethrough, and a resilient fluid passage controllable valve seated in said discharge passage for controlling the flow of pulverulent material therethrough, said magazine including a shell, a filter screen liner, and means for selectively venting and pressurizing said magazine without the loss of material therefrom.

3. A filler unit particularly adapted for high capacity filling of containers with pulverulent material, said filler unit comprising a pulverulent material supply source, a differential gaseous pressure filler, and conduit means between said pulverulent material supply source and said filler and in alignment with said filler, said conduit means including a shut-off valve for sealing said filler above a charge of pulverulent material therein, said filler including a closure portion for closing a container during the filling thereof, and a filter-type probe depending from said closure for evacuating gas from within a container during the filling thereof.

4. A filler unit particularly adapted for high capacity filling of containers with pulverulent material, said filler unit comprising a pulverulent material supply source, a differential gaseous pressure filler, and conduit means between said pulverulent material supply source and said filler and in alignment with said filler, said conduit means including a shut-off valve for sealing said filler above a charge of pulverulent material therein, said filler including a closure portion for closing a container during the filling thereof, a filter-type probe depending from said closure for evacuating gas from within a container during the filling thereof, and means for selectively internally subjecting said probe to a vacuum sub-atmospheric pressure for drawing gases therethrough and a super-atmospheric pressure for effecting a cleaning of said probe.

5. A filler unit particularly adapted for high capacity filling of containers with pulverulent material, said filler unit comprising a pulverulent material supply source, a container closure member, a plurality of differential gaseous pressure fillers connected to said closure member for filling a container therethrough, and a shut-off valve controlling the flow of pulverulent material to each of said fillers, and a plurality of filter-type probes depending from said closure member for venting entrapped air and other gases from pulverulent material within a container during a filling operation.

6. A method of filling a container with pulverulent material comprising the steps of filling the container with loosely disposed pulverulent material, and then forcibly introducing an additional quantity of pulverulent material into the container down through the loosely disposed pulverulent material to the bottom portion of the container and simultaneously removing entrapped air and other gases from within the loosely disposed pulverulent material and compacting the loosely disposed pulverulent material.

7. A method of filling a container with pulverulent material comprising the steps of filling the container with loosely disposed pulverulent material, and then forcibly introducing an additional quantity of pulverulent material into the container down through the loosely disposed pulverulent material under the influence of a differential gaseous pressure to the bottom portion of the container and simultaneously removing entrapped air and other gases from within the loosely disposed pulverulent material and compacting the loosely disposed pulverulent material.

8. A method of filling a container with pulverulent material comprising the steps of filling the container with loosely disposed pulverulent material by gravity, and then forcibly introducing an additional quantity of pulverulent material into the container down through the loosely disposed pulverulent material to the bottom portion of the container and simultaneously removing entrapped air and other gases from within the loosely disposed pulverulent material and compacting the loosely disposed pulverulent material.

9. A method of filling a container with pulverulent material comprising the steps of filling the container with loosely disposed pulverulent material by gravity, and then forcibly introducing an additional quantity of pulverulent material into the container down through the loosely disposed pulverulent material under the influence of a differential gaseous pressure to the bottom portion of the container and simultaneously removing entrapped air and other gases from within the loosely disposed pulverulent material and compacting the loosely disposed pulverulent material.

10. A method of filling a container with pulverulent material from a supply source utilizing a filler of the gaseous pressure differential type and having a magazine, the method comprising the steps of loosely flowing pulverulent material from the supply source through the filler into the container and generally filling the container with loose pulverulent material, sealing off the supply source from the filler, and then topping off the container with more of the material under pressure utilizing the filler while maintaining said seal.

11. The method of claim 10 together with the step of drawing a vacuum within the pulverulent material in the container separate from the operation of the filler at least during the topping off of the container.

12. A method of filling a large capacity container with pulverulent material from a supply source utilizing a plurality of low capacity fillers of the gaseous pressure differential type having a magazine, the method comprising the steps of loosely flowing pulverulent material from the supply source through the fillers and filling the container with loose pulverulent material, sealing the fillers relative to the supply source, and then utilizing the fillers to simultaneously remove entrapped air and other gases from within the loose pulverulent material and add additional pulverulent material to that previously filling the container.

13. The method of claim 12 wherein air and other gases are also removed from the loose pulverulent material remote from the fillers.

References Cited by the Examiner

UNITED STATES PATENTS

| | | | |
|---|---|---|---|
| 744,521 | 11/1903 | Fisk | 141—59 |
| 2,613,864 | 10/1952 | Carter | 141—59 X |
| 2,642,216 | 6/1953 | Carter | 141—59 |
| 2,815,621 | 12/1957 | Carter | 141—59 X |
| 2,956,840 | 10/1960 | Mead | 302—55 |

LAVERNE D. GEIGER, *Primary Examiner.*

H. BELL, *Assistant Examiner.*